3,076,838
CHLORO AND NITRO SUBSTITUTED 2-ARYLOXY-ETHYL ACRYLATE AND METHACRYLATES

Edward M. La Combe, Charleston, and Byron Stewart, South Charleston, W. Va., assignors to Union Carbide Corporation, a corporation of New York
No Drawing. Filed Dec. 27, 1960, Ser. No. 78,241
5 Claims. (Cl. 260—486)

The present invention relates to the production of novel polymerizable aromatic esters, and is especially concerned with the production of chloro and/or nitro ring-substituted 2-aryloxyethyl acrylate and methacrylate esters.

More particularly, the novel chloro and/or nitro ring-substituted 2-aryloxyethyl acrylate and methacrylate esters of this invention can be represented by the general formula:

wherein Ar designates an aryl radical, such as a phenyl or naphthyl radical, R designates either a hydrogen atom or a methyl radical, $m$ designates a value of from 0 to 5, $n$ designates a value of from 0 to 2, and wherein the sum of the values designated by $m$ and $n$ (i.e. $m$ plus $n$) is a value of from 1 to 5. Thus, the aryl ring designated above by Ar can be substituted by up to five chlorine atoms, up to two nitro($-NO_2$) radicals, or any combination thereof not exceeding five substituents. Moreover, the preferred compositions in accordance with this invention are those in which the sum of the values designated by $m$ and n does not exceed 3, particularly when both chloro and nitro substituents are present on the aryl ring.

As illustrative of the novel chloro and/or nitro ring-substituted 2-aryloxyethyl acrylates and methacrylate esters of this invention there can be mentioned the following:

2-(o-nitrophenoxy)ethyl acrylate
2-(m-nitrophenoxy)ethyl methacrylate
2-(p-nitrophenoxy)ethyl acrylate
2-(2,4-dinitrophenoxy)ethyl methacrylate
2-(o-chloropheneoxy)ethyl acrylate
2-(m-chlorophenoxy)ethyl methacrylate
2-(p-chlorophenoxy)ethyl acrylate
2,(2,4-dichlorophenoxy)ethyl methacrylate
2-(2,3,5-trichlorophenoxy)ethyl acrylate
2-(2,4,5-trichlorophenoxy)ethyl methacrylate
2-(2,4,6-trichlorophenoxy)ethyl acrylate
2-(2,3,4,6-tetrachlorophenoxy)ethyl methacrylate
2-pentachlorophenoxyethyl acrylate
2-(2-chloro-3-nitrophenoxy)ethyl methacrylate
2-(2-chloro-4-nitrophenoxy)ethyl acrylate
2-(3-chloro-4-nitrophenoxy)ethyl methacrylate
2-(4-chloro-2-nitrophenoxy)ethyl acrylate
2-(4-chloro-3-nitrophenoxy)ethyl methacrylate
2-(5-chloro-2-nitrophenoxy)ethyl acrylate
2-(5-chloro-2-nitrophenoxy)ethyl methacrylate
2-(2-chloro-6-nitrophenoxy)ethyl acrylate
2-(2-chloro-5-nitrophenoxy)ethyl methacrylate
2-(4-chloro-2,6-dinitrophenoxy)ethyl acrylate
2-(2,6-dichloro-2-nitrophenoxy)ethyl methacrylate
2-(2-nitro-1-naphthoxy)ethyl methacrylate
2-(4-nitro-1-naphthoxy)ethyl acrylate
2-(5-nitro-2-naphthoxy)ethyl methacrylate
2-(8-nitro-2-naphthoxy)ethyl acrylate
2-(2,4-dinitro-1-naphthoxy)ethyl methacrylate
2-(1,6-dinitro-2-naphthoxy)ethyl acrylate
2-(2-chloro-1-naphthoxy)ethyl methacrylate
2-(4-chloro-1-naphthoxy)ethyl acrylate
2-(1-chloro-2-naphthoxy)ethyl methacrylate
2-(2,4-dichloro-1-naptoxy)ethyl acrylate
2,(2-chloro-4-nitro-1-naphthoxy)ethyl methacrylate, and the like Broadly, the preparation of the novel chloro and/or nitro ring-substituted 2-aryloxyethyl acrylate and methacrylate esters of this invention can be effected in a convenient manner from well known starting materials by a two-step process involving the initial reaction of ethylene carbonate with a chloro and/or nitro ring-substituted phenol represented by the general formula:

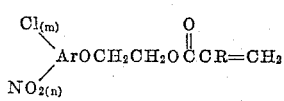

wherein Ar, $m$ and $n$ are as defined above, so as to obtain as an intermediate product the corresponding chloro and/or nitro ring-substituted 2-aryloxyethanol, represented by the general formula:

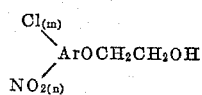

The reaction between the chloro and/or nitro ring-substituted aromatic alcohol and ethylene carbonate is generally performed in the presence of a catalytic amount of an alkaline catalyst such as an alkali metal carbonate, hydroxide, acetate or borate, e.g. potassium carbonate, sodium carbonate, potassium hydroxide, sodium hydroxide, sodium acetate, sodium borate, etc., or the like, if a substantial product yield is to be realized within an efficient period of operation. The desired chloro and/or nitro ring-substituted 2-aryloxyethyl acrylate or methacrylate ester can thereafter be produced by the direct esterification of the intermediate 2-acryloxyethanol through reaction with either acrylic or methacrylic acid, or by transesterification through reaction with either methyl acrylate, methyl methacrylate, or other lower alkyl esters of acrylic or methacrylic acids.

As hereinafter employed in this specification, the terms "substituted phenol," "substituted 2-aryloxyethanol" and "substituted 2-aryloxyethyl acryiate or methacrylate" are meant to include the chloro and/or nitro ring-substituted derivatives thereof, unless otherwise specifically indicated.

Illustrative of the substituted phenols suitable for use as initial reactants there can be mentioned the following:

o-Nitrophenol
m-Nitrophenol
p-Nitrophenol
2,4-dinitrophenol
o-Chlorophenol
m-Chlorophenol
p-Chlorophenol
2,4-dichlorophenol
2,3,5-trichlorophenol
2,4,5-trichlorophenol
2,4,6-trichlorophenol
2,3,4,6-tetrachlorophenol
Pentachlorophenol
2-chloro-3-nitrophenol
2-chloro-4-nitrophenol
3-chloro-4-nitrophenol
4-chloro-2-nitrophenol
4-chloro-3-nitrophenol
5-chloro-2-nitrophenol
3-chloro-5-nitrophenol
2-chloro-6-nitrophenol
2-chloro-5-nitrophenol
4-chloro-2,6-dinitrophenol
2,6-dichloro-2-nitrophenol 4,6-dichloro-2-nitrophenol
2-nitro-1-naphthol
4-nitro-1-naphthol
5-nitro-2-naphthol
8-nitro-2-naphthol
2,4-dinitro-1-naphthol
1,6-dinitro-2-naphthol
2-chloro-1-naphthol
4-chloro-1-naphthol
1-chloro-2-naphthol
2,4-dichloro-1-naphthol
2-chloro-4-nitro-1-naphthol, and the like In an embodiment of the process, the substituted phenol and ethylene carbonate reactants are brought into reactive admixture in any convenient manner, such as by simultaneous or consecutive addition to a suitable reactor. Ordinarily, the reactants are introduced and admixed in approximately stoichiometric, i.e. equimolar proportions, although an excess of either reactant can be employed. In the latter instance, however, the incomplete utilization of the starting material initially present in excess generally renders the operation less desirable from a commercial point of view. When the use of an alkaline catalyst is desired, the catalyst can be incorporated in the reaction mixture simultaneously with either or both of the reactants, or introduced to the reactor prior to or subsequent to the introduction of the reactants. While the amount of alkaline catalyst which can be employed can be varied widely, such amount being readily determinable by those skilled in the art in the light of this disclosure, the catalyst is ordinarily incorporated in the reaction mixture in a concentration of from about 0.2 percent to about 2 percent by weight, based upon the total weight of the reactants, with the incorporation of the catalyst in a concentration of from about 0.5 percent to about 1 percent by weight being preferred. In addition, an inert diluent or solvent for either or both of the reactants, such as diethylbenzene, tetralin, a eutectic mixture of biphenyl and diphenyl oxide, or the like, can also be employed, that is to say incorporated in the reaction mixture, although the use of such a diluent or solvent is in no way essential to the process. The reaction mixture is then heated to an elevated temperature for a length of time sufficient to bring about the desired reaction in which the substituted 2-aryloxyethanol is produced.

The operable temperature range for this reaction is not narrowly limited. Preferably, the reaction is conducted at a temperature of from about 140° C. to about 185° C., while good results can be obtained at reaction temperatures varying broadly from about 125° C. to about 225° C. Higher or lower reaction temperatures can also be employed. However, at reaction temperatures substantially below 125° C., the rate of reaction may decrease to an extent such that little product yield is obtained within an efficient period of operation. On the other hand, reaction temperatures appreciably above 225° C. may engender an excessive discoloration of the desired product or the substantial formation of undesirable by-products. Moreover, the reaction is generally carried out at atmospheric pressure, although somewhat higher or lower pressures are also operable.

Upon completion of the reaction, as determined, for instance, by a cessation in the evolution of carbon dioxide which is ordinarily removed as a by-product during the course of the reaction, the alkaline catalyst, when present, can be neutralized by the addition of a suitable acid, such as a concentrated or dilute mineral acid, e.g. hydrochloric acid, sulfuric acid, phosphoric acid, etc., or the like, to the crude reaction product. While discretionary, the neutralization of the alkaline catalyst at this time serves to minimize or eliminate unwanted side reactions during subsequent treatment of the product. Thereafter, the substituted 2-aryloxyethanol intermediate can be recovered from the crude reaction product by any conventional procedure, such as by fractional distillation or crystallization. Other recovery procedures will occur to one skilled in the art and can also be employed satisfactorily in this connection.

The subsequent esterification of the substituted 2-aryloxyethanol intermediate to produce the desired corresponding acrylic or methacrylic acid ester can be carried out, for example, by admixing the alcohol with either acrylic acid or methacrylic acid in any convenient manner, and by heating the resulting mixture, preferably with reflux, to a temperature of from about 30° C. and more preferably from about 60° C. up to about 120° C., or somewhat higher. Of particular expedience to the direct esterification is the removal of the water of esterification formed during the course of the reaction. To this end, an entrainer, such as benzene, diisopropyl ether or the like, is usually included in the reaction mixture to assist in the removal of the water of esterification as an azeotrope. In addition, it is preferable to carry out the direct esterification in the presence of a catalytic amount of an acidic esterification catalyst, such as sulfuric acid, phosphoric acid, alkanesulfonic acids, or the like. Moreover, due to the polymerizable nature of the unsaturated ester product, an inhibiting quantity of one or more polymerization inhibitors, such as copper powder, hydroquinone, p-methoxyphenol, or the like, is also generally incorporated in the reaction mixture. Atmospheric pressure is ordinarily employed for the reaction, although somewhat higher or lower pressures can also be used.

The acrylic acid or methacrylic acid is desirably admixed with the substituted 2-aryloxyethanol in an amount at least equal to the stoichiometric amount required for esterification, i.e. in at least equimolar proportions. Less than a stoichiometric amount of acid can also be utilized, accompanied usually by a decreased product yield.

When the use of a direct esterification catalyst is desired, particularly good results can be obtained by the introduction of the catalyst to the reaction mixture in a concentration of from about 0.5 percent to about 2 percent by weight, based upon the total weight of the reactants. Any catalytic amount can be employed, however. Thus, for example, the use of the catalyst in a concentration of from about 0.1 percent by weight, or slightly lower, up to about 5 percent by weight, and even higher, will, broadly speaking, permit satisfactory conversion to the desired substituted 2-aryloxyethyl acrylate or methacrylate ester product.

Similarly, the amount of polymerization inhibitor to be used, when desired, can be varied within a broad range. While any inhibiting amount can be incorporated in the esterification reaction mixture with good results, the incorporation of the inhibitor in a concentration of from about 0.1 percent to about 2 percent by weight or slightly higher, based upon the total weight of the reactants, and particularly from about 0.2 percent to about 1 percent by weight, is preferred.

Upon completion of the direct esterification, as evidenced, for instance, by a cessation in the formation of water of esterification, the acidic catalyst can be neutralized by the addition of a suitable alkaline compound, such as sodium ethoxide, calcium hydroxide, the hydroxide or carbonate of either sodium or potassium, or the like, to the crude reaction product. While descretionary, the neutralization of the acidic catalyst at this time serves in helping to inhibit polymerization during the subsequent treatment of the crude reaction product. Thereafter, the substituted 2-aryloxyethyl acrylate or methacrylate ester thus produced can be recovered from the crude reaction product by fractional distillation, crystallization, or any other conventional manner well known to one skilled in the art.

The desired acrylate or methacrylate ester can also be obtained by admixing the intermediate substituted 2-aryloxyethanol with either methyl acrylate, methyl methacrylate or other lower alkyl ester of acrylic or methacrylic acid in any convenient manner, and by heating the resulting mixture, preferably with reflux, to a temperature of from about 30° C. and more preferably from about 60° C. up to about 120° C., or somewhat higher. Of particular expedience to the transesterification is the removal of the lower alkyl alcohol formed during the course of the reaction. Thus, an entrainer such as those described above can be incorporated in the reaction mixture to assist in the removal of the lower alkyl alcohol as an azeotrope. It is also preferable to carry out the transesterification in the presence of both a catalytic amount of a conventional transesterification catalyst, such as an alkyl titanate, any of the acids hereinabove mentioned as esterification catalysts, a lower alkoxide of magnesium, such as magnesium methoxide, or the like, and an inhibiting quantity of a polymerization inhibitor as described above in connection with the direct esterification. Atmospheric pressure is ordinarily employed for the reaction although somewhat higher or lower pressures can also be used.

The methyl acrylate, methyl methacrylate or other lower alkyl ester of acrylic or methacrylic acid employed as a reactant is desirably admixed with the substituted 2-aryloxyethanol in an amount at least equal to the stoichiometric amount required for transesterification, i.e. in at least equimolar proportions. Preferably, the ester reactant is employed in a molar excess of from about 2 to about 10 moles of the ester per mole of the substituted 2-aryloxyethanol. Less than a stoichiometric amount of the ester reactant can also be utilized, accompanied usually by a decreased product yield.

When the use of a transesterification catalyst is desired, particularly good results can be obtained by the introduction of the catalyst to the reaction mixture in a concentration of from about 0.5 percent to about 2 percent by weight, based upon the total weight of the reactants. Any catalytic amount can be employed however. Thus, for example, the use of the transesterification catalyst in a concentration of from about 0.1 percent by weight, or slightly lower, up to about 10 percent by weight, and even higher, will, broadly speaking, permit satisfactory conversion to the desired substituted 2-aryloxyethyl acrylate or methacrylate ester.

Upon completion of the transesterification, as evidenced, for instance, by a cessation in the formation of alcohol, the catalyst can be removed, as for examble, by neutralization or, in the case of the magnesium alkoxides, by treatment with water. Thereafter, the substituted 2-aryloxyethyl acrylate or methacrylate ester product thus produced can be recovered from the crude reaction product in any convenient manner, such as by the procedures described above in connection with the direct esterification.

The substituted 2-aryloxyethyl acrylates and methacrylate esters of this invention find use in a variety of applications possessing as they do both polar and ester groups. Such compounds can be employed, for example, as plasticizers for vinyl resins. The substituted 2-aryloxyethyl acrylate and methacrylate esters can be polymerized by contact, under conventional polymerizing conditions, with a polymerization catalyst such as a peroxide, e.g., diacetyl peroxide, dibenzoyl peroxide, etc., to form useful homopolymers or copolymers with other ethylenically unsaturated compounds, such as the vinyl esters of alkyl carboxylic acids or alkyl acrylate esters. The polymers thus formed can, in turn, be incorporated in, or blended with, acrylonitrile polymers in minor amounts, thus providing polymeric acrylonitrile compositions suitable for use, for example, in the production of synthetic fibers, and which evidence a high degree of dye receptivity.

This invention can be illustrated further by the following specific examples of its practice, but is not intended to be limited thereby.

Example I

A 1-liter, four-necked reaction flask was fitted with a mechanical stirrer, a thermometer, and a condenser vented to a wet test meter which serves to indicate the volume of $CO_2$ produced as a by-product. The reaction flask was also surrounded by an electric mantle heater. To the flask there were charged 278 grams (2 moles) of o-nitrophenol, 176 grams (2 moles) of ethylene carbonate and 4.5 grams of potassium carbonate. The charge was stirred and heated to a temperature of 140° C., whereupon gaseous carbon dioxide started evolving from the mixture at a modest rate and was removed. After a reaction period of about one-half hour had elapsed, the temperature of the reaction mixture was raised to 155° C., accompanied by continued stirring, and, after a further period of about two hours, the evolution of carbon dioxide had ceased. During the elapsed reaction period, 49.7 liters of carbon dioxide were evolved as measured at room temperature on the wet test meter. Stirring was continued for an additional period of one-half hour at a temperature of 155° C. Thereafter, heating was discontinued and the contents of the reaction flask, weighing about 370 grams, were cooled and transferred to a 1-liter distillation flask. The potassium carbonate catalyst was then neutralized by the addition of 10 milliliters of concentrated hydrochloric acid, and the resulting mixture fractionally distilled using a Claisen-type still. Distillation yielded about 315 grams of 2-(o-nitrophenoxy)ethanol, boiling at a temperature of 157° C. to 158° C., under a reduced pressure of 2 millimeters of mercury. The product had a refractive index ($n$ 30/D) of $1.5622\pm.0001$. Both infrared spectrum analysis and elemental analysis of the product confirmed the formation of 2-(o-nitrophenoxy)ethanol.

In a similar manner, 2-nitro-1-naphthol is reacted with ethylene carbonate to produce 2-(2-nitro-1-naphthoxy)-ethanol.

Example II

In a manner similar to that described in Example I, 695 grams (5 moles) of p-nitrophenol, 440 grams (5 moles) of ethylene carbonate and 3 grams of potassium carbonate were admixed in a reaction flask and heated with stirring at a temperature of 160° C. for a period of two hours. At this temperature gaseous carbon dioxide was slowly evolved and removed as formed. The temperature of the reaction mixture was then elevated to between 170° C. and 175° C. and maintained for a further reaction period of four hours. During the elapsed period, about 110 liters of carbon dioxide were evolved and measured. The reaction mixture was allowed to stand overnight at room temperature. Thereafter, heating of the mixture, accompanied by continued stirring, was resumed at a temperature of between 175° C. and 180° C. for a period of three hours. A total of about 120 liters of carbon dioxide, measured at room temperature, had been evolved at this point. Heating was discontinued and the contents of the reaction flask then poured into a large beaker and cooled to room temperature to crystallize. This solid, crystalline material was dissolved in 2,500 milliliters of hot benzene, decolorized with carbon black, filtered, and again crystallized by cooling the solution. The crystalline material thus obtained was filtered, collected on a Buchner funnel, and, after air drying at room temperature, weighed about 830 grams. The crystalline material still possessed some color and was extracted with 3000 milliliters of dibutyl ether, recrystallized by cooling the extract, filtered and dried. In this manner, about 211 grams of 2-(p-nitrophenoxy)ethanol were recovered as thin needles having a melting point of 93.5° C. to 94° C. Both infrared spectrum analysis and elemental analysis of the product confirmed the formation of 2-(p-nitrophenoxy)ethanol. The residue remaining after the dibutyl ether extraction was dissolved in 1500 milliliters of hot ethanol, treated with carbon black, filtered while hot, and crystallized by allowing the solution to cool. The crystalline material thus obtained was then recrystallized from 1500 milliliters of ethanol. In this manner, an additional yield of about 190 grams of 2-(p-nitrophenoxy)ethanol was obtained as tan needles having a melting point of 90° C. to 91° C.

In similar manner, 4-nitro-1-naphthol is reacted with ethylene carbonate to produce 2-(4-nitro-1-naphthoxy)-ethanol.

*Example III*

In a manner similar to that described in Example I, 489 grams (3 moles) of 2,4-dichlorophenol, 264 grams (3 moles) of ethylene carbonate and 3 grams of potassium carbonate were admixed in a reaction flask and heated with stirring at a temperature of between 160° C. and 170° C. for a period of three and one-half hours. During the elapsed period, about 77 liters of gaseous carbon dioxide were evolved and removed as formed. The contents of the reaction flask were then cooled, transferred to a 1-liter distillation flask, and fractionally distilled in a simple still. Distillation yielded about 528 grams of 2-(2,4-dichlorophenoxy)ethanol, boiling at a temperature of 114° C. to 116° C., under a reduced pressure of 0.3 millimeters of mercury. The product had a refractive index ($n$ 30/D) of 1.5627±.0001. Both infrared spectrum analysis and elemental analysis of the product confirmed the formation of 2-(2,4-dichlorophenoxy)ethanol.

In similar manner, 2-chlorophenol, 2-chloro-1-naphthol and 2,4-dichloro-1-naphthol are each reacted with ethylene carbonate to produce 2-(2-chlorophenoxy)ethanol, 2-(2-chloro-1-naphthoxy)ethanol and 2-(2,4-dichloro-1-naphthoxy)ethanol, respectively.

*Example IV*

A three-liter, four-necked, creased reaction flask was attached to a 30 millimeter by 12 inch fractionation column packed with glass helices and was fitted with thermometer and mechanical stirrer. The fractionation column was surmounted with a water decanting still head. To the reaction flask there were charged 312 grams (1.7 moles) of 2-(o-nitrophenoxy)ethanol, obtained as described in Example I, 146 grams (1.7 moles) of methacrylic acid, 800 grams of benzene, 14 grams of sulfuric acid, 2.1 grams of hydroquinone and 0.7 gram of copper powder. The charge was stirred and heated at reflux for a period of nine and one-half hours. During this period, the water of esterification that formed was removed as an azeotrope with benzene, and at the conclusion thereof, about 28 milliliters of water had been so collected. The contents of the reaction flask were then washed, first with 600 milliliters of a 5 percent sodium hydroxide solution whereupon most of the color in the mixture was discharged, and thereafter with 500 milliliters of water. The washed material was then transferred to a 2-liter distillation flask and stripped of benzene in a Claisen-type still to a kettle temperature of 70° C. under a reduced pressure of 4 millimeters of mercury. The dark-colored oily residue remaining in the distillation flask, weighing about 385 grams, had a refractive index ($n$ 30/D) of 1.5320. 100 grams of this oily residue was fractionally distilled in a Claisen-type still, whereby about 19 grams of 2-(o-nitrophenoxy)ethyl methacrylate, having a refractive index of 1.5315, were obtained at a boiling point of 153° C. to 154° C., under a reduced pressure of 1 millimeter of mercury; another portion of the product, weighing about 68 grams and having a refractive index of 1.5316 and a melting point of 35° C. to 38° C., was obtained as a fraction at a boiling point of 148° C. to 150° C. under a reduced pressure of 0.7 millimeter of mercury. Both of these fractions crystallized upon cooling to room temperature. The residue in the fractionation still, weighing about 13 grams, consisted principally of polymeric material.

The remaining 285 grams of the original oily residue were dissolved in isopropyl ether and recrystallized by cooling the solution in an ice bath. The crystalline product thus obtained was filtered, collected on a Buchner funnel, and air dried at room temperature. In this manner, an additional yield of about 205 grams of 2-(o-nitrophenoxy)ethyl methacrylate was recovered having a melting point of 38° C. to 39° C. Both infrared spectrum analysis and elemental analysis of the crystalline product confirmed the formation of 2-(o-nitrophenoxy)-ethyl methacrylate. Under identical reaction conditions, a second batch of 2-(o-nitrophenoxy)ethyl methacrylate was prepared and washed. The crude reaction product was then fractionally distilled to yield about 424 grams of 2-(o-nitrophenoxy)ethyl methacrylate.

In a similar manner, 2-(2-nitro-1-naphthoxy)ethanol is reacted with methacrylic acid to produce 2-(2-nitro-1-naphthoxy)ethyl methacrylate.

*Example V*

In a manner similar to that described in Example IV, 366 grams (2 moles) of 2-(o-nitrophenoxy)ethanol, obtained as described in Example I, 158 grams (2.2 moles) of acrylic acid, 1000 grams of benzene, 3.2 grams of hydroquinone and 0.75 gram of copper powder were stirred in a reaction flask and heated at reflux for a period of four hours. During this period, about 36 milliliters of water of esterification were removed as an azeotrope with benzene. The contents of the reaction flask were then washed, first with 800 milliliters of a 5 percent sodium hydroxide solution, and thereafter with 600 milliliters of water containing 100 grams of dissolved sodium chloride. The washed material was then transferred to a distillation flask, stripped of benzene and fractionally distilled using a Claisen-type still. Distillation yielded about 154 grams of 2-(o-nitrophenoxy)ethyl acrylate boiling at a temperature of 140° C. to 141° C., under a reduced pressure of 0.6 millimeter of mercury. The product had a refractive index ($n$ 30/D) of 1.5450. Both infrared spectrum analysis and elemental analysis of the product confirmed the formation of 2-(o-nitrophenoxy)ethyl acrylate.

In a similar manner, 2-(2-nitro-1-naphthoxy)ethanol is reacted with acrylic acid to produce 2-(2-nitro-1-naphthoxy)ethyl acrylate.

*Example VI*

In a manner similar to that described in Example IV, 211 grams (1.15 moles) of 2-(p-nitrophenoxy)ethanol, obtained as described in Example II, 112 grams (1.25 moles) of methacrylic acid, 600 grams of toluene, 9 grams of mixed alkanesulfonic acids (a product of the Indoil Chemical Company, having a neutral equivalent of 112), 2.0 grams of hydroquinone and 0.5 gram of copper powder were stirred in a reaction flask and heated at reflux for a period of six and one-half hours. During this period, about 20.5 milliliters of water of esterification were removed as an azeotrope with benzene. The contents of the reaction flask was then filtered while hot to remove the solids present and crystallized by cooling to room temperature. The crystalline material thus obtained was filtered, collected on a Buchner funnel and air-dried at room temperature. The crystalline material then was recrystallized twice from 750 milliliter portions of methanol, filtered and dried. In this manner, about 124 grams of 2-(p-nitrophenoxy)ethyl methacrylate were recovered as fine needles having a melting point of 90.5° C. to 91° C. The methanol filtrates from each recrystallization were combined, concentrated to about 500 milliliters, and cooled, whereupon an additional yield of about 40 grams of 2-(p-nitrophenoxy)ethyl methacrylate was recovered as a crystalline product. Both infrared spectrum analysis and elemental analysis of the product confirmed the formation of 2-(p-nitrophenoxy)-ethyl methacrylate.

In a similar manner, 2-(4-nitro-1-naphthoxy)ethanol is reacted with acrylic acid to produce 2-(4-nitro-1-naphthoxy)ethyl acrylate.

*Example VII*

A 2-liter distillation flask equipped with a stirrer was attached to a 28 mm. x 33 in. fractionation column packed with glass helices. To the flask there were charged 207 grams (1 mole) of 2(2,4-dichlorophenoxy)ethanol, obtained as described in Example III, 200 grams (2 moles) of methyl methacrylate, 400 grams of benzene, 2 grams of phenyl-β-naphthylamine and 22 milliliters of an 18 percent solution of magnesium methoxide in methanol. The charge was stirred and heated at reflux for a period of two hours. During this period, about 158 grams of a methanol-benzene azeotrope, having a refractive index ($n$ 30/D) of 1.4465, were recovered as a distillate. The amount of methanol thus recovered was 49 grams, as determined by refractive index interpolation. The contents of the flask were then cooled to room temperature and treated with 15 milliliters of water to destroy the catalyst. The resultant mixture contained some polymer which was precipitated by adding the mixture to 800 milliliters of methanol and subsequently filtering the mixture to remove the precipitated polymer. The filtrate was stripped of low boiling solvent and excess methyl methacrylate in a short Claisen still. The residue was then fractionally distilled in the same still, whereupon 43 grams of crude 2-(2,4-dichlorophenoxy)ethyl methacrylate, melting at 53° C. to 60° C., were obtained at a boiling point of 121° C. to 130° C., under a reduced pressure of 1 to 2 millimeters of mercury; another portion of the product, weighing about 171 grams and having a melting point of 62° C. to 63° C., was obtained as a fraction at a boiling point of 128° C. to 131° C., under a reduced pressure of 1 millimeter of mercury. The residue in the still, weighing 9 grams, consisted of polymeric material. Both infrared spectrum analysis and elemental analysis of the 171-gram fraction product confirmed the formation of 2-(2,4-dichlorophenoxy)ethyl methacrylate.

In similar manner 2-(2,4-dichloro-1-naphthoxy)ethanol is reacted with methyl methacrylate to produce 2-(2,4-dichloro-1-naphthoxy)ethyl acrylate.

*Example VIII*

One hundred grams of 2-(o-nitrophenoxy)ethyl methacrylate, 100 grams of acetonitrile and 3.3 milliliters of a 25 percent by weight solution of diacetyl peroxide in dimethylphthalate were charged to a 300 milliliter polymerization bottle. The bottle was purged with nitrogen, sealed by capping and rotated in a water bath maintained at a temperature of 50° C. for a period of seventy and one-half hours. A polymeric product was formed. The product was cooled and poured into 1500 milliliters of methanol to precipitate the polymer. The precipitated polymer was then filtered and dried at a temperature of 50° C. In this manner, about 60 grams of poly[2-(o-nitrophenoxy)-ethyl methacrylate] was recovered as a soft and slightly tacky product suitable for blending in a minor amount with an acrylonitrile polymer to provide a composition evidencing a high degree of dye receptivity.

In a similar manner 2-(2-nitro-1-naphthoxy)ethyl acrylate is polymerized to produce poly[2-(2-nitro-1-naphthoxy)ethyl acrylate].

The invention is broadly susceptible to modification within the scope of the appended claims.

What is claimed is:

1. The aromatic ester of the formula

wherein Ar is selected from the group consisting of the phenyl and naphthyl radicals, R is selected from the group consisting of hydrogen and the methyl radical, and $n$ is a value of from 1 to 2.

2. 2-(o-nitrophenoxy)ethyl acrylate.
3. 2-(o-nitrophenoxy)ethyl methacrylate.
4. 2-(p-nitrophenoxy)ethyl methacrylate.
5. 2-(2-nitro-1-naphthoxy)ethyl methacrylate.

References Cited in the file of this patent

UNITED STATES PATENTS

| | | |
|---|---|---|
| 2,338,683 | Coleman et al. | Jan. 4, 1944 |
| 2,362,189 | Coleman et al. | Nov. 7, 1944 |
| 2,407,131 | Bruson et al. | Sept. 3, 1946 |
| 2,868,843 | Moyle | Jan. 13, 1959 |
| 2,987,555 | Davis | June 6, 1961 |
| 2,988,571 | McFie et al. | June 13, 1961 |

OTHER REFERENCES

Peppel: Industrial and Engineering Chemistry, 1958, vol. 50, No. 5, pp. 767–770.